Oct. 10, 1933.        W. T. GUTH        1,929,636
TIRE CARRIER
Filed March 6, 1931        3 Sheets-Sheet 1
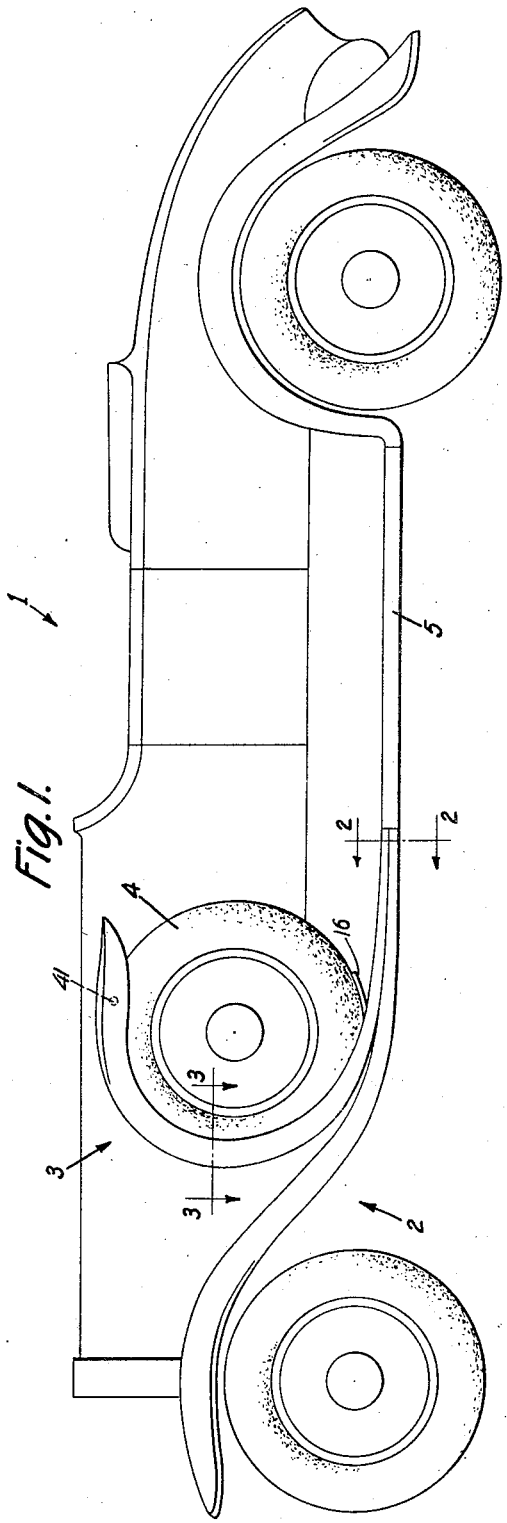
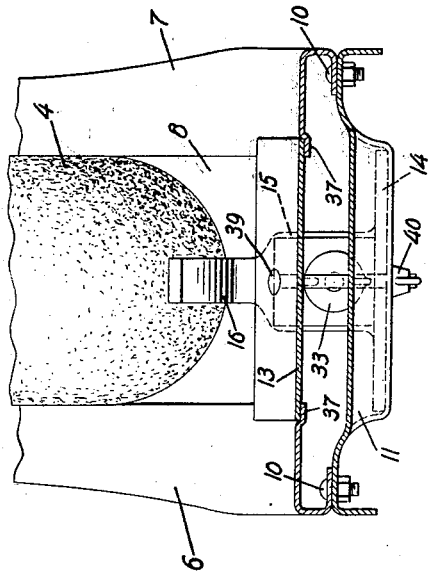
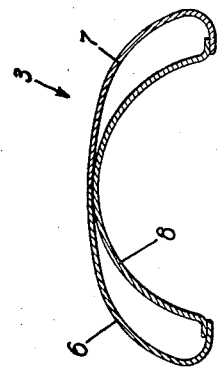
INVENTOR
William T. Guth.
BY Moses & Nolte
ATTORNEYS Oct. 10, 1933.  W. T. GUTH  1,929,636
TIRE CARRIER
Filed March 6, 1931   3 Sheets-Sheet 2
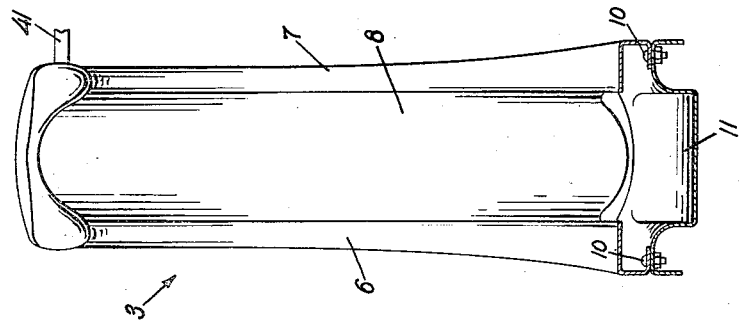
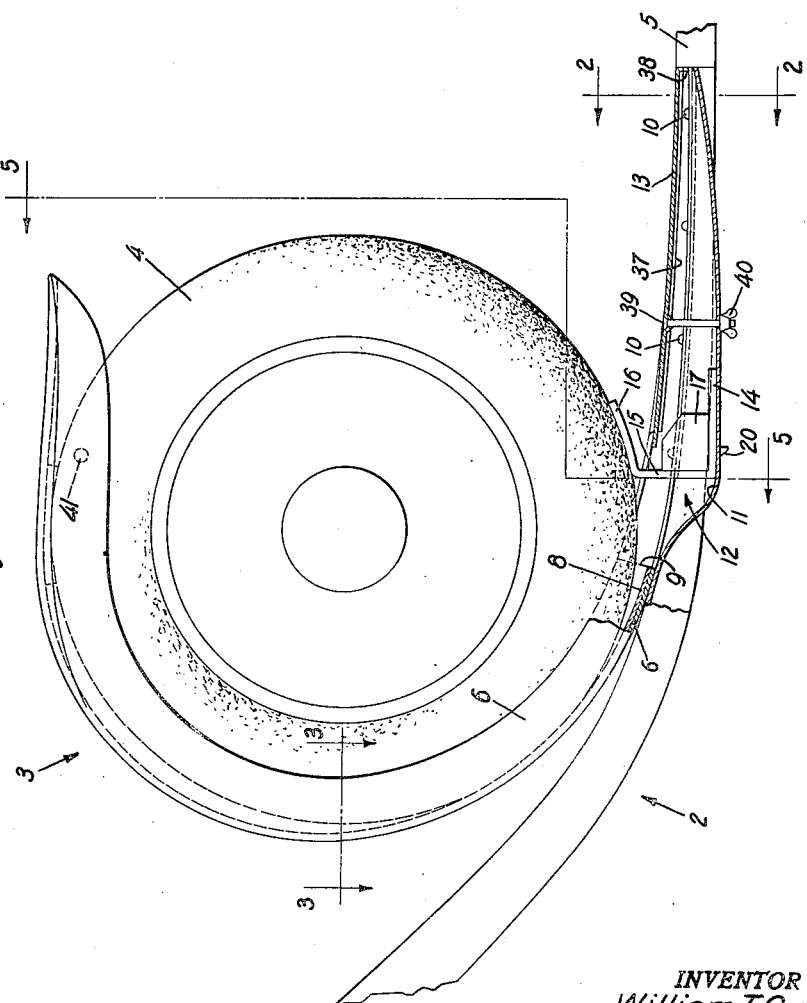
INVENTOR
William T. Guth.
BY Moses & Nolte
ATTORNEYS Oct. 10, 1933.   W. T. GUTH   1,929,636
TIRE CARRIER
Filed March 6, 1931   3 Sheets-Sheet 3
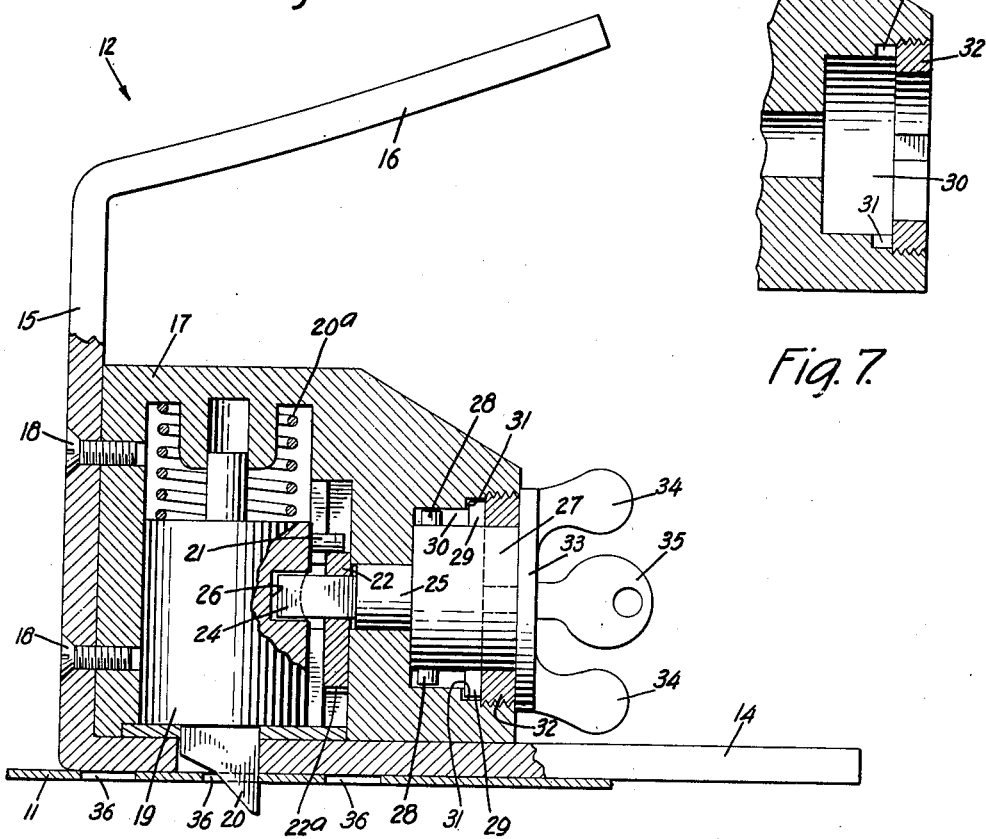
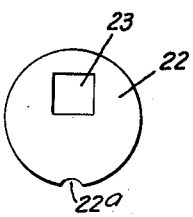
INVENTOR
William T. Guth.
BY
ATTORNEYS Patented Oct. 10, 1933

1,929,636

UNITED STATES PATENT OFFICE 1,929,636

TIRE CARRIER

William T. Guth, Brooklyn, N. Y.

Application March 6, 1931. Serial No. 520,563

6 Claims. (Cl. 224—29)

This invention relates to tire carriers for automobiles, and has for an object to provide a tire carrier in which the spare tire and wheel may be easily placed and securely locked, and from which they can be conveniently removed. It is a further object of the invention to provide a tire carrier having the advantages above referred to, and which may be made of an ornamental construction in harmony with the design of the other portions of the vehicle.

Other objects and advantages will hereinafter appear.

In the drawings forming part of this specification:

Figure 1 is a side elevation of a motor vehicle having the invention embodied therein;

Figure 2 is a fragmentary, vertical, sectional view taken on the line 2—2 of Figures 1 and 4, looking in the direction of the arrows;

Figure 3 is a horizontal, sectional view taken on the line 3—3 of Figures 1 and 4, looking in the direction of the arrows;

Figure 4 is a fragmentary, side elevation partly broken away, and on a larger scale than Figure 1;

Figure 5 is a vertical, sectional view taken on the line 5—5 of Figure 4, looking in the direction of the arrows;

Figure 6 is a detail view in elevation, partly broken away, showing the locking mechanism employed;

Figure 7 is a fragmentary, detail, sectional elevation of a portion of the locking mechanism; and Figure 8 is a detail view illustrating an eccentric employed for operating the bolt of the lock.

The motor vehicle 1 comprises a front fender 2 on which a tire carrier 3 is mounted for holding a spare tire 4. The tire carrier 3 is roughly semi-circular in form and in cross section is of open trough shape. At the lower rear end the tire carrier is elongated and rests upon the fender 2. The tire carrier, as best seen in Figure 3, is made up of outer pieces 6 and 7 and an inner piece 8, the pieces 6 and 7 being welded to one another to form in effect an integral structure, and the piece 8 being welded to the pieces 6 and 7. The piece 8 terminates along the line 9 (see Figure 4), while the pieces 6 and 7 continue rearward and rest upon marginal portions of the fender 2 to which they are attached by bolts 10. The tire carrier as thus far described is permanently fixed to the fender and forms a gently inclined guide up which the tire may be rolled to the position in which it is seen in Figures 1 and 4. This inclined guide portion forms substantially a continuation of the running board 5. The fender 2 is provided with a depression 11 at the lower rear end thereof in which tire locking mechanism 12 is adapted to be inserted. A removable cover plate 13 is adapted to be put in place after the lock has been inserted and secured in locking position.

The lock comprises an angle bracket including a base 14, a vertical web 15, and a tire engaging segment 16. A lock housing 17 (see Figure 6) is secured to the vertical web 15 by screws 18, which screws are inaccessible when the locking device is in tire locking position. The housing encloses a cylinder 19 having a bolt 20 integral with or fixed to it, and this cylinder is normally thrust to the lower limit of its movement by a coil spring 20a. The cylinder has fixed upon one side thereof a pin 21 which engages the upper side of an operating eccentric 22. The eccentric 22 has a square opening 23, and is mounted upon a square portion 24 of a shaft 25. The square portion of the shaft 25 extends into an opening 26 in the cylinder 19 and positively prevents upward displacement of the bolt 20 so long as the mechanism is locked. The shaft 25 also has fixed upon it a drum 27. This drum carries relatively short, fixed lugs 28 and relatively long retractable lugs 29. The drum is received in a recess 30 of the lock housing 17, while the retractable lugs 29 extend outward into notches 31 beyond the periphery of the recess 30. A ring 32 threaded in the housing prevents withdrawal of the drum 27, shaft 25, and associated parts, from the housing. A disc 33 outside the housing is fast to the drum 27 and is provided with operating handles 34. A key 35 insertable into the drum is operable to retract the pins 29 within the periphery of the drum. When the pins 29 have been so retracted, the handles 34 may be operated to pull the drum longitudinally outward until such movement is arrested by engagement of the fixed lugs 28 with the ring 32. This movement withdraws the end of shaft 25 from the recess in the cylinder 19, leaving the cylinder and the bolt free to be retracted. It does not, however, withdraw the square end 24 of the shaft 25 from within the operating eccentric 22. With the parts withdrawn to the position described, the shaft 25 may now be rotated by manipulation of the handles 34 to turn the eccentric 22, and this movement causes the eccentric to thrust the pin 21 upward, and thus to raise the cylinder 19 and the bolt 20, so that the locking mechanism as a whole can be removed from the fender. The eccentric is provided with a shallow notch 22a for yieldingly retaining the cylinder in its uppermost position.

When a tire has been put in place and it is desired to lock the same, the locking mechanism is inserted in the recess 11 of the fender and thrust forward until the segment 16 firmly engages the tire, whereupon the handles 34 are turned to project the bolt 20 through one of the openings 36 in the fender. The handles are then thrust forward, the key 35 is operated to project the lugs 29, and the key is withdrawn.

The cover plate 13 is then put in place upon off-set flanges 37 provided on the pieces 6 and 7 of the tire carrier, the forward end of the plate 13 extending beneath the pieces 6 and 7 in the portions thereof which are not offset, and a rear abutment flange 38 of said plate 13 being located against the forward end of the running board. The cover plate is then secured in place by a bolt 39, passed through the cover plate and the fender and held in place by a wing nut 40. The cover plate serves to conceal the recess in the fender and the mechanism contained in said recess.

While the tire carrier has been described as generally semi-circular in form, it will be observed that it need not conform to the shape of the tire, but may be varied in shape as desired so long as the tire is engaged at two points by the tire carrier and at a third by the segment 16, as illustrated, for example, in Figure 4. The upper end of the tire carrier may be braced, to make it more rigid, by a post 41 located between the tire rack and the car body and suitably secured to each.

I have described what I believe to be the best embodiment of my invention. I do not wish, however, to be confined to the embodiment shown, but what I desire to cover by Letters Patent is set forth in the appended claims.

I claim:

1. In a motor vehicle, the combination with a fender, of a tire carrier mounted thereon, said tire carrier embracing the tire and terminating at its lower end above a recess formed in the fender, and locking means insertable in said recess for locking the tire against removal from the carrier.

2. In a motor vehicle, the combination with a fender, of a tire carrier mounted thereon, said tire carrier embracing the tire and terminating at its lower end above a recess formed in the fender, locking means insertable in said recess for locking the tire against removal from the carrier, and a removable cover plate for covering and concealing the recess and the locking means located therein.

3. In a motor vehicle, the combination with a fender, of a tire carrier mounted thereon, said tire carrier embracing the tire and terminating at its lower end in an inclined runway along which the tire may be rolled, and means for retaining the tire in the carrier, comprising a bracket that includes a base removably engageable with the fender, a segment engageable with the lower, rear portion of the tire, and means for locking the bracket at will in fixed relation to the tire carrier.

4. In a motor vehicle, the combination with a fender, of a tire carrier mounted thereon, said tire carrier embracing the tire and terminating at its lower end in an inclined runway along which the tire may be rolled, and a wedge-shaped retaining device for holding the tire snugly in place, said retaining device including key-operated locking means.

5. In a motor vehicle, the combination with a fender, of a tire carrier mounted thereon, said tire carrier embracing the tire and terminating at its lower end in an inclined runway along which the tire may be rolled, and a wedge-shaped retaining device for holding the tire snugly in place, said retaining device including a bolt cooperative with the fender, and key-controlled mechanism for projecting and retracting said bolt.

6. In a motor vehicle, the combination with a fender, of a tire carrier mounted thereon, said tire carrier embracing the entire forward half of the tire, extending rearward at its upper end beyond the top of the tire in a substantially horizontal direction, and terminating at its lower end in a runway along which the tire may be rolled forward to its final position in the carrier, and means cooperative with the tire carrier and the fender and secured against the lower, rear side of the tire for locking the tire in place.

WILLIAM T. GUTH.